United States Patent [19]
Martin

[11] Patent Number: 4,553,815
[45] Date of Patent: Nov. 19, 1985

[54] OPTICAL FIBER CABLE CONSTRUCTION

[75] Inventor: Frank E. Martin, Chester, Md.

[73] Assignee: Westinghouse Electric Corp., Pittsburgh, Pa.

[21] Appl. No.: 464,433

[22] Filed: Feb. 4, 1983

[51] Int. Cl.$^4$ ............................................... G02B 5/13
[52] U.S. Cl. ............................ 350/96.23; 350/96.29; 350/96.34
[58] Field of Search ................ 350/96.23, 96.29, 96.34

[56] References Cited

U.S. PATENT DOCUMENTS

| 3,508,950 | 9/1966 | Marzocchi | 350/96.34 X |
| 3,930,103 | 12/1975 | Chimura et al. | 350/96.34 X |
| 4,390,589 | 6/1983 | Geyling et al. | 350/96.29 X |

FOREIGN PATENT DOCUMENTS 0007249  1/1978  Japan ................................. 350/96.29

OTHER PUBLICATIONS

"Liquid Crystal Polymers", Journal of Polymer Science, Polymer Chemistry Edition, vol. 14, 2043-2058, (1976).

Primary Examiner—William L. Sikes
Assistant Examiner—Akm E. Ullah
Attorney, Agent, or Firm—D. Schron

[57] ABSTRACT

An optical fiber cable wherein the optical fiber is cushioned with an elastomeric material around which is provided a protective cladding of a liquid-crystal material.

7 Claims, 5 Drawing Figures

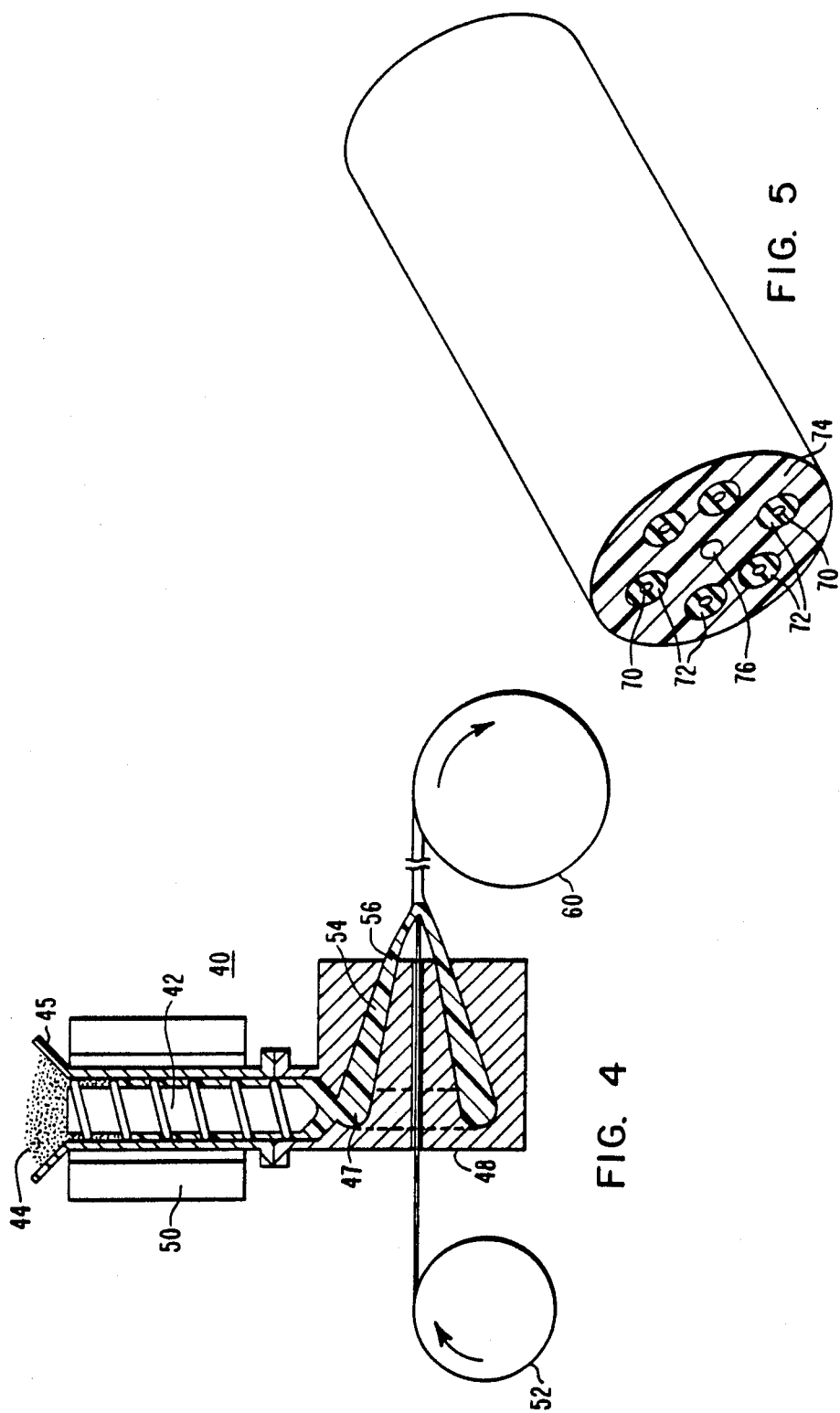

OPTICAL FIBER CABLE CONSTRUCTION

BACKGROUND OF THE INVENTION

1. Field of the Invention

The invention in general relates to optical fibers, and particularly to an optical fiber cable with an improved cable jacketing.

2. Description of the Prior Art

In a fiber optic system, light energy, generally provided by a laser light source, is transmitted via an optical fiber for conveying information to a distant location.

Many uses dictate the requirement for a rugged optical fiber cable since damage to the optical fiber by means of cable kinks, twists, snags, or the like can objectionably degrade, if not destroy, proper transmission. In one type of optical fiber cable an elastomeric material such as room temperature vulcanizable silicone rubber surrounds the optical fiber providing a buffer layer and a fiber reinforced resin outer shell surrounds the silicone rubber layer. This construction provides for an extremely rugged optical fiber cable having high abrasion, impact and rupture resistance and a tensile strength to elongation ratio measurable in millions of psi. To achieve this ruggedness, the fiber-impregnated resin outer shell is relatively stiff and can only be wound around drums having certain minimum diameter. Various tactical situations exist, wherein the need for such high strength is not required and wherein space constraints dictate the use of a relatively small diameter spool or drum for storage and deployment of the optical fiber cable.

The present invention provides for an improved optical fiber cable construction which provides for more than adequate strength for many deployment and use situations and which can be manufactured with relative ease and at costs below that of the fiber impregnated resin cables.

SUMMARY OF THE INVENTION

The cable includes an optical fiber for conduction of light energy signals with a buffer coating of elastomeric material around the optical fiber. Optical fiber protection and cable strength is provided by means of a liquid-crystal polymer protective cladding around the surface of the elastomeric material. Such liquid-crystal polymer in solid form is melted by means of the application of heat and is applied to the coated optical fiber by conventional extrusion techniques.

A plurality of optical fibers may be provided together with the coating of elastomeric material, and liquid-crystal polymer protective cladding applied, to form a multi-stranded cable construction.

BRIEF DESCRIPTION OF THE DRAWINGS

FIG. 4 illustrates one embodiment for applying the outer cladding of the optical fiber cable; and FIG. 5 is a sectional view of a multi-stranded cable.

DESCRIPTION OF THE PREFERRED EMBODIMENT

Optical fibers are utilized in a great variety of systems wherein laser light energy is transmitted from one location to another. In other than controlled environmental conditions, the fiber is utilized in an optical fiber cable arrangement to protect it not only during deployment, but during actual use in what may be a hostile environment.

Figure 1:
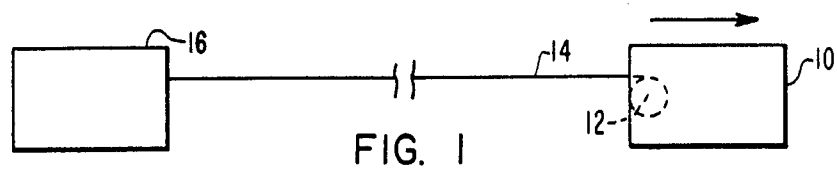
FIG. 1 is a block diagram illustrating a typical deployment of an optical fiber cable.

FIG. 1 depicts a typical situation wherein a carrier or deployment vehicle 10 includes a spool 12 upon which is wound an optical fiber cable 14 connected to a remote location 16 which may be a data gathering station. Movement of the vehicle 10 relative to the station 16 results in an unwinding of the cable from the spool. Due to vehicle constraints, in various tactical situations, the size (diameter) of the spool is severely limited dictating that the optical fiber cable be sufficiently resilient so as to be able to wind around the small spool diameter and yet be of sufficient strength to withstand the rigors of deployment and use.

Although conventional thermoplastic-coated optical fiber cables are flexible enough to wind around the small diameter spool, they are not strong enough to withstand the stresses involved in deployment, a typical such cable having a tensile strength to elongation ratio of 250,000 psi, or less. Although the cable with the fiber reinforced resin jacket exhibits a tensile strength to elongation ratio of millions of psi, such cable tends to be too thick and too stiff for some uses, such as depicted in FIG. 1.

Figure 2:
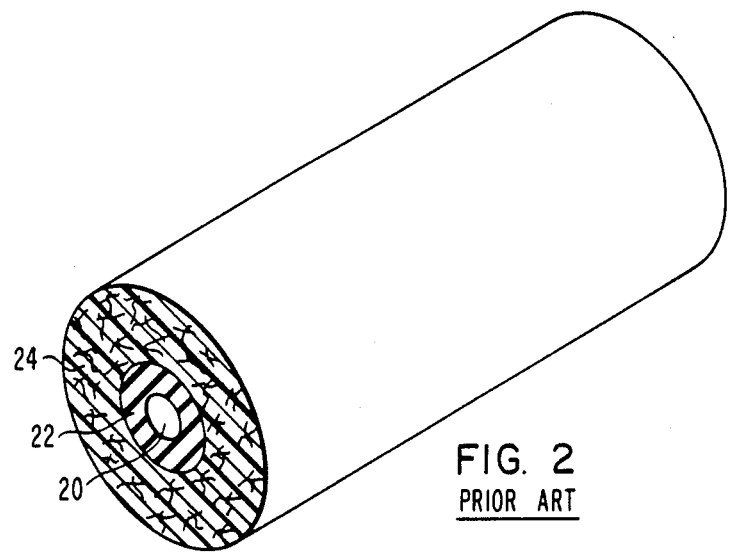
FIG. 2 is a sectional view of a typical prior art rugedized optical fiber cable.

A typical fiber-reinforced resin optical fiber cable of the prior art is illustrated in FIG. 2. The cable includes an optical fiber core 20 (which itself may be made up of one or more different layers) surrounded by an elastomeric material 22, typically a room temperature vulcanizable silicone rubber which forms a protective low modulus buffer or cushion for the optical fiber core. Outer jacket 24 is a fiber-reinforced resin shell which provides the cable with extremely high abrasion, impact and rupture resistance. The outer shell results in a minimum cable diameter of approximately 40 to 50 mils.

Figure 3:
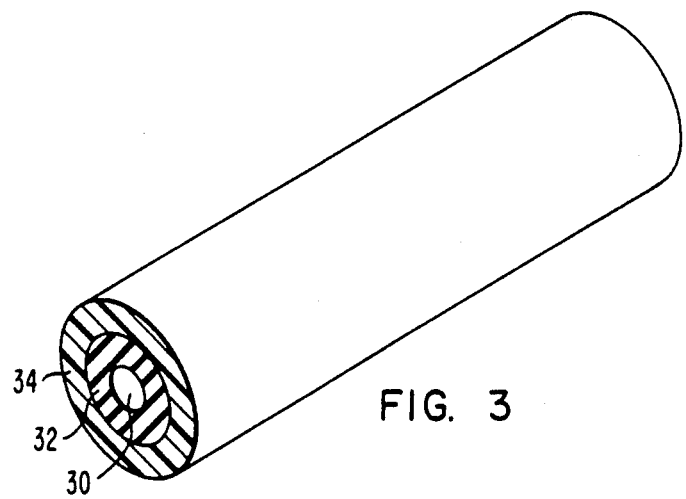
FIG. 3 is a sectional view of a preferred embodiment of the present invention.

FIG. 3 illustrates one embodiment of the present invention which allows for an optical fiber cable, which may be of smaller diameter and greater flexibility than that illustrated in FIG. 2. The cable includes an optical fiber core 30 as well as an elastomeric material 32 such as room temperature vulcanized silicone rubber, for cushioning the core.

The cable includes a protective cladding 34 around the surface of the elastomeric material 32, with the cladding being a liquid-crystal polymer, resulting in a jacket with extremely high mechanical strength imparting to the cable a tensile strength to elongation ratio in excess of 1 million psi, while still maintaining sufficient flexibility so that the cable may be wound around a relatively small diameter spool.

The liquid-crystal polymer is of the class which has a nematic structure and consists of rigid, rod-like, overlapping molecular aggregates or domains. These function as the polymer's self-contained reinforcing elements. One type of copolymer which may be utilized by way of example as the protective cladding 34 is polyethylene terephthalate (PET) copolymerized with para-hydroxybenzoic acid (PHB). Another liquid-crystal polymer which may be utilized as the protective cladded is 2-6 naphthalenedicarboxylic acid/hydroquinone/p-hydroxybenzoic acid (N/HQ/PHB).

FIG. 4 represents a simplified representation of a conventional extruder 40 which includes a screw feeder 42 for delivering the liquid-crystal material 44 introduced into hopper 45 to an annular chamber 47 in a crosshead tubing die 48. Liquid-crystal material 44 such as PET with 60% by weight of PHB may be introduced in granular or powdered form, which is then converted to liquid form by application of heat in the melt-temperature range of the material by means of one or more heaters 50.

A supply spool 52 delivers the optical fiber with its coating of silicone rubber to the die 48 for application of the liquid-crystal protective cladding which flows from annular chamber 47 via an annular passageway 54 to emerge at an output annulus 56 having a cross-sectional area which is approximately nine or ten times the cross-sectional area of the applied protective liquid-crystal cladding. This approximate 10:1 reduction in cross section promotes orientation of stiff rod-like molecules of the liquid-crystal polymer, with this molecular orientation being in the direction of the fiber and imparting high strength to the cable thus produced. Another desirable feature provided by the arrangement is a substantially zero coefficient of linear expansion. That is, the liquid-crystal coating does not shrink in a linear direction as it cools. After the coating process, the cable is wound about a constant tension takeup spool 60 from which it may be wound on a smaller diameter specialized spool such as illustrated in FIG. 1.

The liquid-crystal protective cladding described herein may also be utilized for multi-stranded optical fiber cables such as illustrated in FIG. 5. The plurality of optical fibers 70, each jacketed with a cushioning layer of silicone rubber 72 are arranged in a multi-stranded array. A liquid-crystal polymer, as previously described, forms the protective outer cladding 74 which imparts a strength to the cable so as to either eliminate the need for a strengthening member or to allow for the use of a much lighter weight or fewer number of strengthening members, represented by the fiber 76.

I claim:

1. An improved optical fiber cable construction, comprising:
   (A) an optical fiber for conduction of light energy signals;
   (B) a coating of elastomeric material around the surface of said optical fiber;
   (C) a liquid-crystal polymer protective cladding around the surface of said elastomeric material; and
   (D) said liquid-crystal polymer being of the type which is thermoplastic and which forms rigid, rod-like molecular aggregates in an overlapping, orientable fashion, at a point in its melt cycle.
2. Apparatus according to claim 1 wherein:
   (A) said liquid-crystal polymer is PET/PHB.
3. Apparatus according to claim 2 wherein:
   (A) said PHB is 60% by weight.
4. Apparatus according to claim 1 wherein:
   (A) said liquid-crystal polymer is N/HQ/PHB.
5. Apparatus according to claim 1 which includes:
   (A) a plurality of optical fibers each including said coating of elastomeric material;
   (B) said liquid-crystal polymer protective cladding surrounding said plurality of optical fibers.
6. A method of making an optical fiber cable comprising the steps of:
   (A) providing a coated optical fiber to the die member of an extruding machine;
   (B) providing a liquefied liquid-crystal polymer to said die member to coat said coated optical fiber therewith.
7. A method in accordance with claim 6 wherein:
   (A) said extruding machine includes a heated feed section; and
   (B) said liquid-crystal polymer is provided to said feed section in solid form.

* * * * *